US012686416B2

(12) United States Patent
Gillespie, III et al.

(10) Patent No.: US 12,686,416 B2
(45) Date of Patent: Jul. 21, 2026

(54) PERCEPTION ASSISTANCE

(71) Applicant: GM Cruise Holdings LLC, San Francisco, CA (US)

(72) Inventors: Arthur L Gillespie, III, Sunnyvale, CA (US); Katherine Mary Stumpf, San Francisco, CA (US); Anisha Mocherla, Chicago, IL (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 188 days.

(21) Appl. No.: 18/360,195

(22) Filed: Jul. 27, 2023

(65) Prior Publication Data

US 2025/0033675 A1 Jan. 30, 2025

(51) Int. Cl.
B60W 60/00 (2020.01)

(52) U.S. Cl.
CPC ............................... B60W 60/0059 (2020.02)

(58) Field of Classification Search
CPC .......... B60W 60/0059; G05D 2105/20; G05D 1/622; G05D 1/2249; G05D 2107/13; G05D 2109/10
See application file for complete search history.

(56) References Cited

U.S. PATENT DOCUMENTS

| | | | | |
|---|---|---|---|---|
| 8,996,224 B1* | 3/2015 | Herbach | ............ | B60W 60/0011 701/25 |
| 2019/0011912 A1* | 1/2019 | Lockwood | ........... | G05D 1/0231 |
| 2019/0019349 A1* | 1/2019 | Dolgov | .................. | G07C 5/008 |
| 2019/0299984 A1* | 10/2019 | Shalev-Shwartz | ........ | B60T 7/18 |
| 2021/0048814 A1* | 2/2021 | Ghorbanian-Matloob | .................. G05D 1/0027 |
| 2022/0388536 A1* | 12/2022 | Kothbauer | ........... | G05D 1/0038 |
| 2023/0132029 A1* | 4/2023 | Gao | ..................... | G05D 1/0011 701/24 |
| 2023/0139551 A1* | 5/2023 | Zhao | .................. | B60W 30/0956 701/26 |
| 2023/0196784 A1* | 6/2023 | Winter | ................. | G06V 10/764 701/24 |

* cited by examiner

*Primary Examiner* — James J Lee
*Assistant Examiner* — Andrew Sang Kim
(74) *Attorney, Agent, or Firm* — CANTOR COLBURN LLP

(57) ABSTRACT

Aspects of the disclosed technology provide systems and methods that allow adjustment of a perception of an object by an autonomous vehicle (AV). The system includes a remote assistance platform (RAP) communicatively coupled to the AV. The RAP has a user interface that enables a human Remote Advisor to view an environment around the AV through a sensor system of the AV and issue instructions to the AV. The RAP is configured to allow the Remote Advisor to select an adjustment of the perception of the object by the AV and instruct the AV to implement the selected adjustment and then navigate autonomously.

20 Claims, 5 Drawing Sheets

100

200

400
102
402
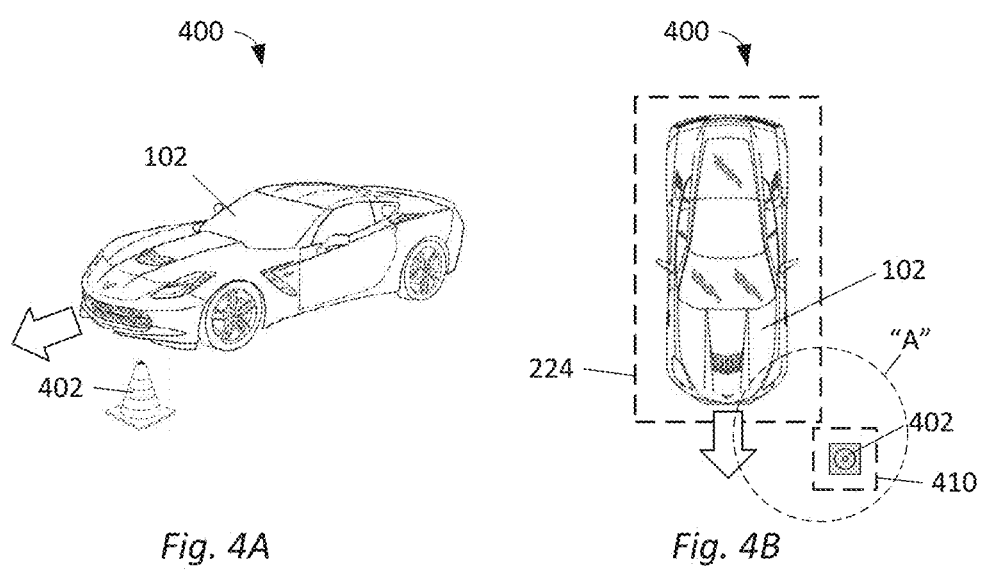
*Fig. 4A*
400
224
102
"A"
402
410
*Fig. 4B*
102
224
402    410
510
520
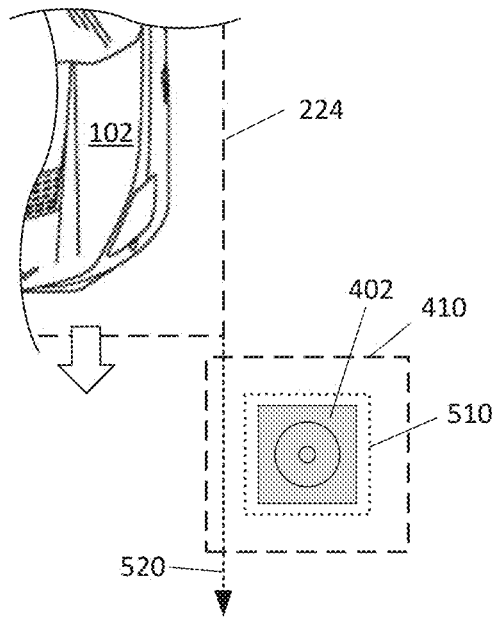
*Fig. 5*
*(enlarged view of "A"*
*from FIG. 3B)*
520
102
224
402    410
522
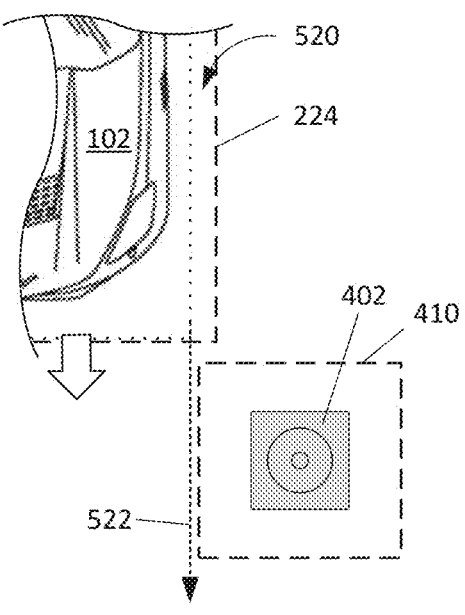
*Fig. 6*
*(enlarged view of "A"*
*from FIG. 3B)*

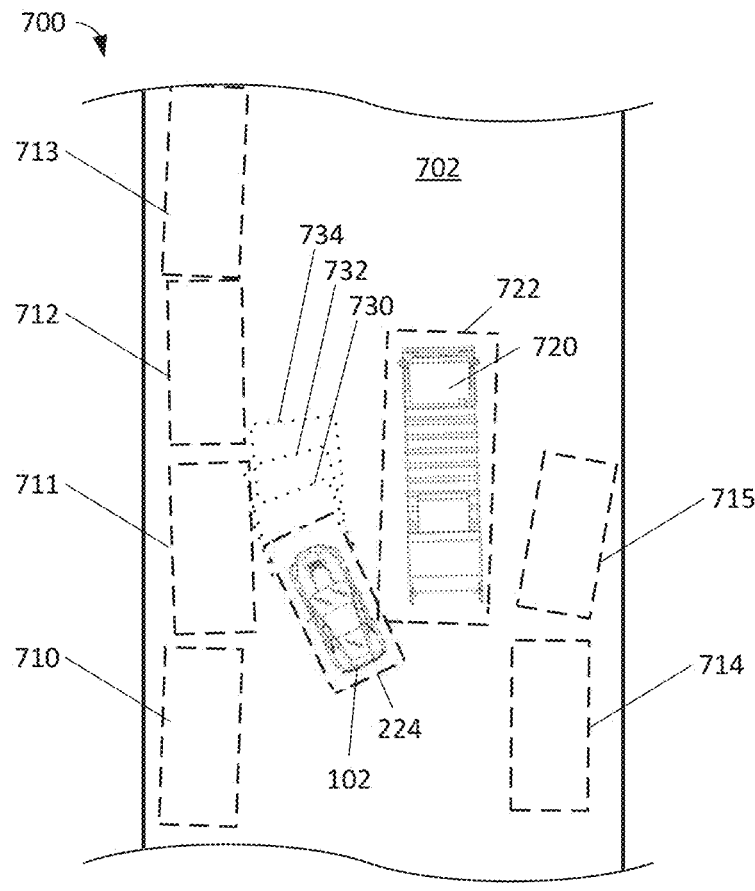
*Fig. 7*
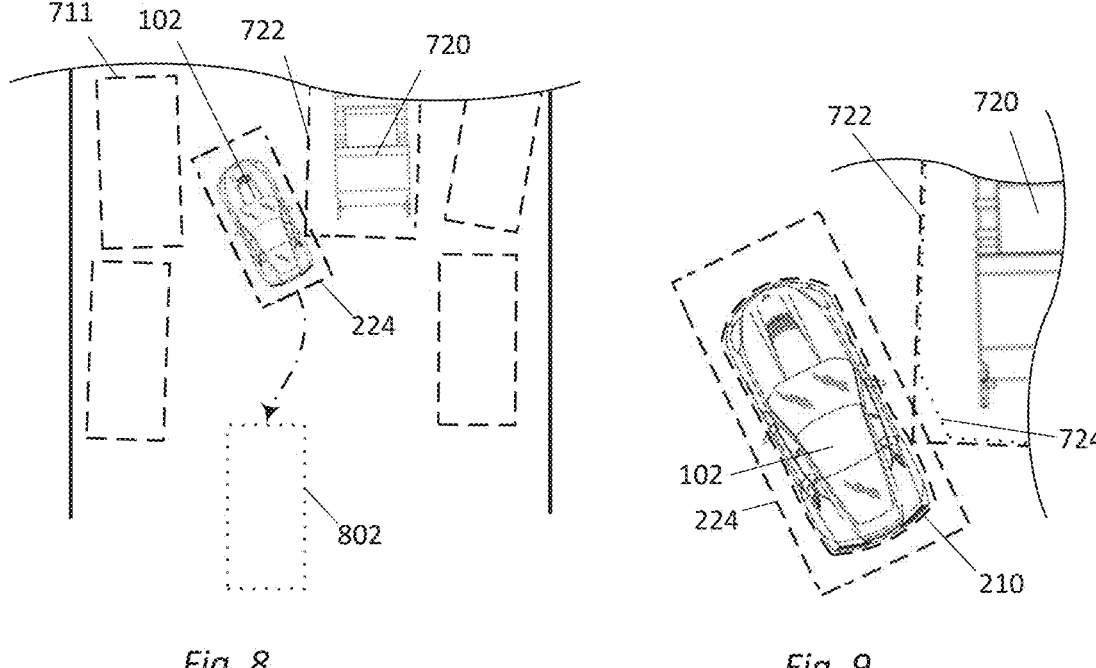
*Fig. 8*
*Fig. 9*

PERCEPTION ASSISTANCE

BACKGROUND

1. Technical Field

The present disclosure generally relates to sensing and avoidance of objects by an autonomous vehicle (AV).

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as detection of objects proximate to the AV in order to provide safe and efficient transportation. In certain cases, an AV may encounter a situation where its internal guidance software is unable to determine a safe path forward given the sensed objects in its environment. When this occurs, a human Remote Advisor reviews the situation and takes actions as appropriate to safely guide the AV out of the situation.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings.

FIGS. 4A-6 depict an example scenario that illustrates how perception assistance enables an AV to autonomously navigate past an obstacle, according to some aspects of the disclosed technology.

FIGS. 7-9 depict example scenarios that illustrate how perception assistance enables an AV to autonomously navigate past an obstacle, according to some aspects of the disclosed technology.

DETAILED DESCRIPTION

Figure 1:
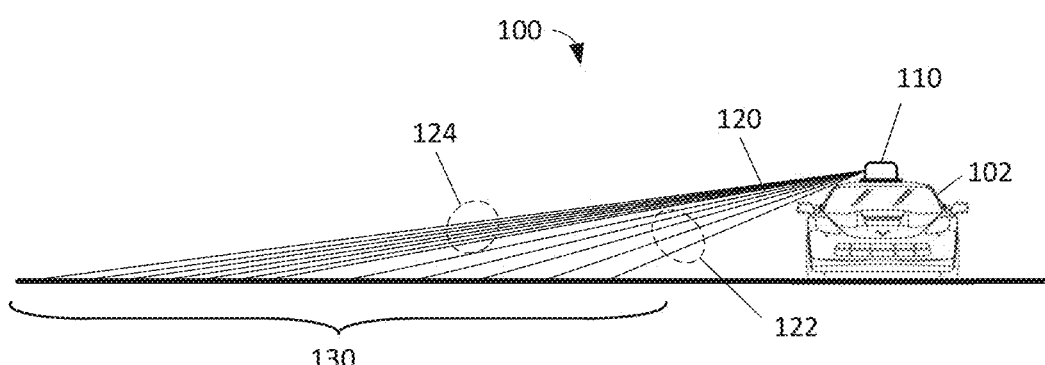
FIG. 1 illustrates an example AV environment, according to some aspects of the disclosed technology.

The detailed description set forth herein is intended as a description of various example configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. It will be clear and apparent that the subject technology is not limited to the specific details set forth herein and may be practiced without these details. In some instances, structures and components are shown in block diagram form in order to avoid obscuring the concepts of the subject technology.

AV navigation systems require information about the surrounding environment in order to avoid objects/entities as well as navigate through the environment. The AV perceives objects around itself through multiple types of sensors, e.g., imaging cameras, Radio Detection and Ranging (RADAR), and Light Detection and Ranging (LiDAR) sensors. When an object is detected, it is classified and a "footprint" is defined based on the sensor signals. In certain embodiments, the footprint comprises a best-estimate three-dimensional (3D) model of the actual object shape and size; e.g., the surface as detected by a LiDAR reflection, plus a buffer zone around the best-estimate surface. In certain embodiments, the buffer has a minimum "thickness" that is associated with the uncertainty of the sensor. In certain embodiments, the buffer smooths the boundary of the footprint, e.g., removing recesses and features, so as to simplify the processing of the footprint. In certain embodiments, the separation of the 3D footprint surface and the actual object is not uniform in all directions based on one or more of the expected interaction of the AV with the object, the characteristics of the object, and the classification of the object. In certain embodiments, a template or standard footprint for the classification is selected from a library based on the object's classification. Further, the AV has its own footprint defined relative to the sensors and the AV navigation system chooses a path that avoids an overlap of the AV footprint with the footprints of surrounding objects. In certain circumstances, e.g., a car stopped in the street, the AV will reach a point where it cannot find a path forward that avoids all proximate object footprints. When this occurs, a human Remote Advisor is notified and connects to the AV and reviews the situation via the onboard sensors. In some situations, options for the Remote Advisor are (1) instruct the AV to ignore the problem object, or (2) manually steer the AV to a viable path forward. Option #1 has an inherent risk that certain safeguards of the AV navigation software have been bypassed and the AV may collide with an object that it has been instructed to ignore. Option #2 has an inherent risk in that the Remote Advisor is remote and only able to see through the cameras and sensors of the vehicle and the bandwidth required to provide the full stream of images and data from the AV to the Remote Advisor may be prohibitive, thus forcing the Remote Advisor to "drive" the AV with limitations, e.g., one or more of limited vision, lack of audio, latency in the transfer of information, and a lack of context from the time preceding the take-over by the Remote Advisor, that may result in a collision or other risky situation. There is a need to enable the Remote Advisor to appropriately modify the perception of the object without removing it entirely from the perception of the AV.

The systems and methods disclosed herein address these issues with the above described systems by providing additional options for the Remote Advisor to modify the perception of the objects and allow the AV to proceed with its safeguards still fully in place, thus avoiding the risks of both options #1 and #2 described above. In certain embodiments, the simulation platform or other subsystem of the data center identifies an obstruction that prevents autonomous navigation of the AV. In certain embodiments, the remote assistance platform or other subsystem of the data center analyzes the sensor data from the AV and offers one or more possible perception adjustments that may enable the AV to autonomously navigate past the obstruction.

FIG. 1 illustrates an example AV environment 100, according to certain aspects of the disclosed technology. A LiDAR system 110 is disposed on an AV 102 and configured to scan a field of view (FOV) 130. In certain embodiments, the LiDAR system 110 has a sparse illumination and/or detector configuration. In certain embodiments, the LiDAR illumination is a near-field flash system. In certain embodiments, the LiDAR system 110 is positioned near a roofline of AV 102 and pointed down towards the ground, as shown in FIG. 1, to detect objects in proximity to AV 102. In certain embodiments, the beam 120 comprises a first portion 122 that has a first intensity, e.g., an intensity suitable for detecting objects within a first distance from the LiDAR unit 110, and a second portion 124 that has a second intensity that is greater than the first intensity, e.g., an intensity suitable for detecting objects within a region that is beyond the first distance (i.e., up to a second distance that is greater than the first distance). In certain embodiments, the FOV 130 has a shape, e.g., an area defined by a minimum threshold intensity of light emitted by the LiDAR unit 110.

The AV 102 "perceives" an object that is within the FOV 130 by evaluating the sensor outputs, e.g., LiDAR return signals and/or the images of an imaging camera, and determining that an object exists at a specific location. The AV 102 then attempts to classify the object, with the possibility that the object cannot be assigned to a class and is therefore classified as "unknown." In each case, the classified object is assigned a footprint (discussed with respect to FIG. 2) to be avoided. The AV 102 then uses this footprint, and other attributes associated with the object or the class to which it has been assigned, while autonomously navigating. As used herein, the term "perception" includes the detection of the object, the sensor output associated with the object, the class assigned to the object, the attributes of the assigned class, the footprint assigned to the object, rules for navigating around the object, and risks associated with the object.

Figure 2:
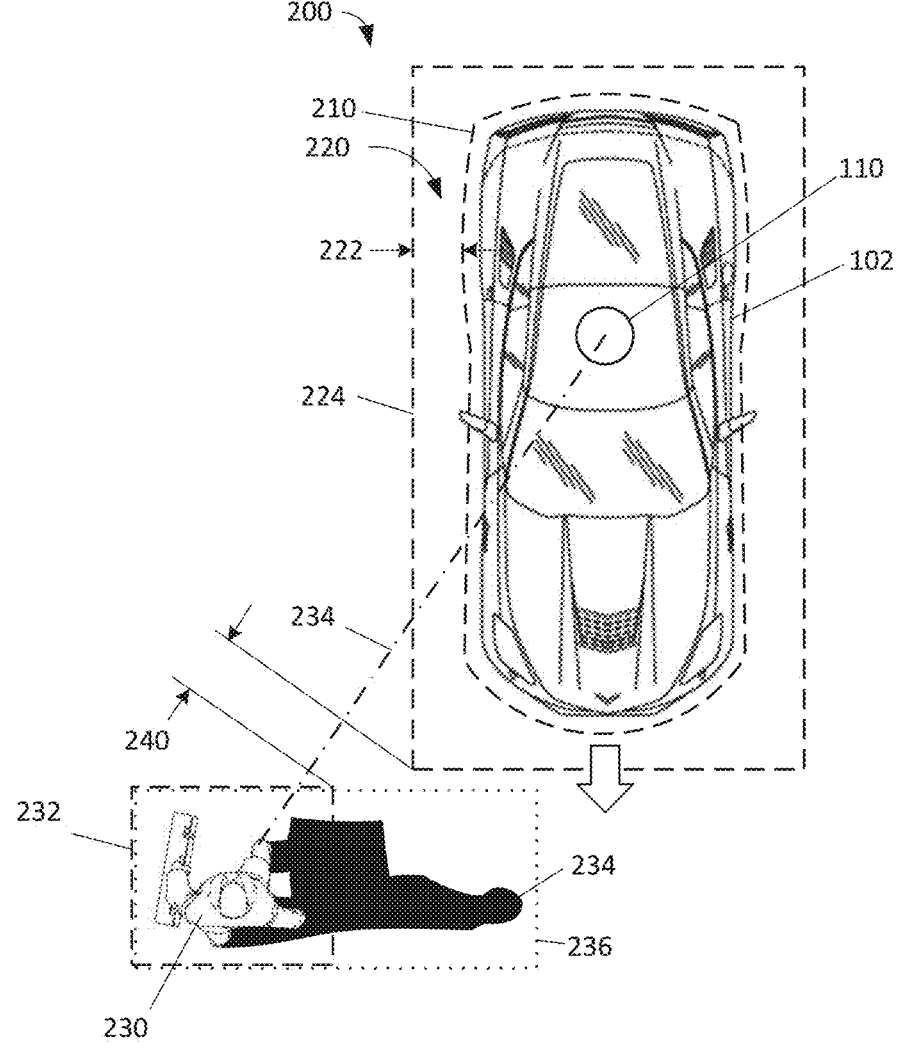
FIG. 2 illustrates an example AV environment, according to certain aspects of the disclosed technology.

FIG. 2 illustrates an example AV environment 200, according to certain aspects of the disclosed technology. The AV 102 has an outline 210 defined with respect to a coordinate system of the AV 102. In certain embodiments, the outline 210 is sized such that the actual AV 102 is completely included within the outline 210. In certain embodiments, the outline 210 has an irregular shape, e.g., conforms to the physical shape of the AV 102. In certain embodiments, the outline 210 is a rectangle or other standard geometric shape. A buffer 220 is defined around the AV 102 with a minimum distance 222. An AV footprint 224 is defined by the addition of the buffer distance 222 around the outline 210. In certain embodiments, the buffer distance 222 is added to all sides of the outline 210 to define the footprint 224. In certain embodiments, the amount of buffer distance 222 added to one or more sides of the outline 210 is different from one or more other sides, e.g., the buffer distance added to the rear of the outline 210 is less than the buffer distance 222 added to the sides of the outline 210.

Objects, e.g., a person 230, are detected by one or more sensors of the AV 102. In this example, the person 230 has been detected by the LiDAR unit 110 along axis 234. Once detected, the object is classified, e.g., object 230 is classified as a person, and a footprint 232 is selected for the classified object. The AV 102, e.g., the perception stack 312 of FIG. 3, determines a separation distance 240 between the AV footprint 224 and the footprint 232 of object 230. Based on a knowledge of the projected path of the AV 102, e.g., projected by the prediction stack 316 of FIG. 3, the AV 102 determines whether the AV footprint 224 will intersect the object footprint 232. If the two footprints will not intersect, the AV 102, e.g., the control stack 322 of FIG. 3, will drive the AV 102 on the planned route.

Figure 3:
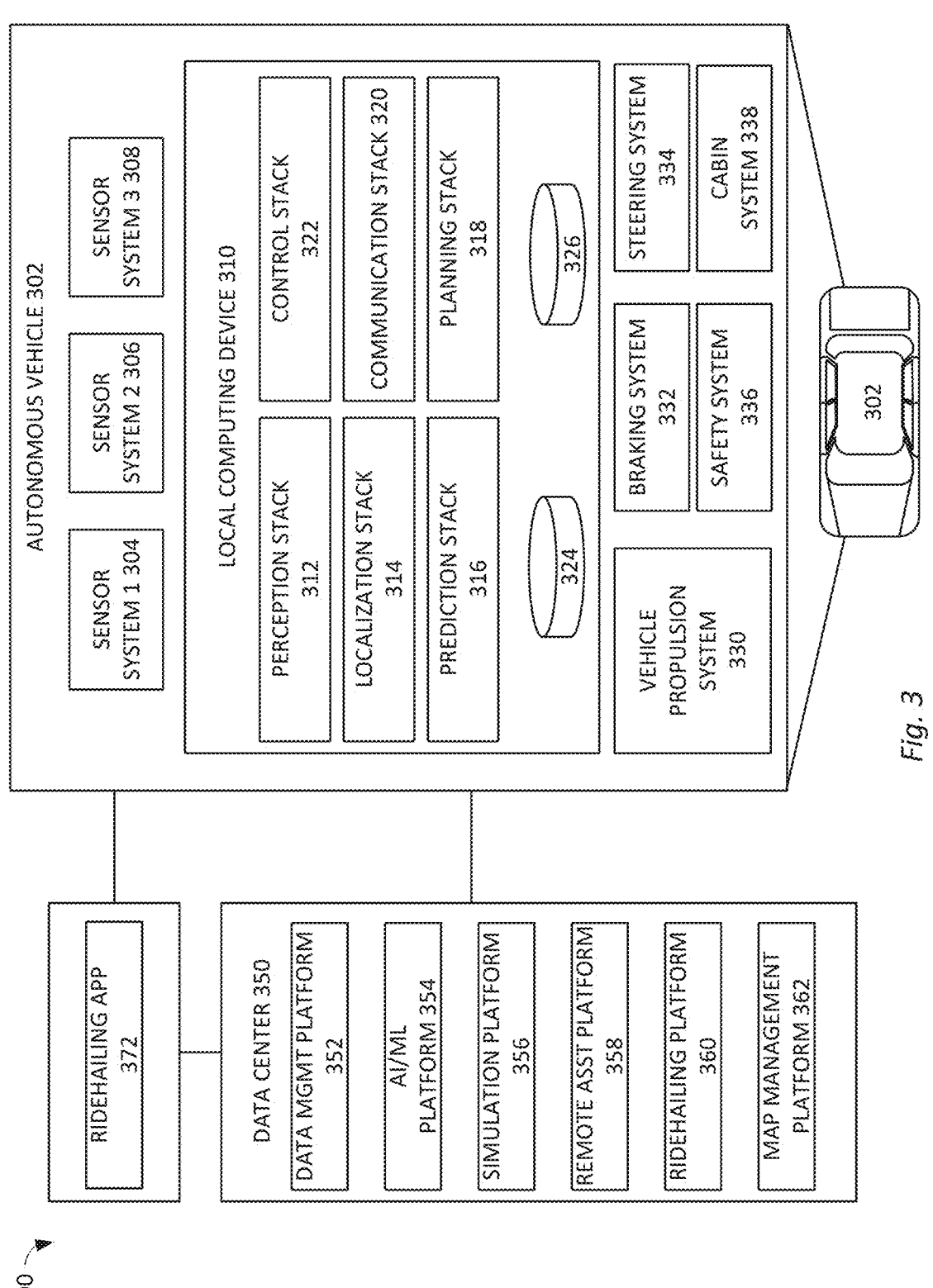
FIG. 3 illustrates an example system environment that can be used to facilitate AV operations, according to some aspects of the disclosed technology.

There are various situations wherein the sensors of the AV 102 provide data that cause the perception stack 312 of FIG. 3 to assign a footprint 232 that is poorly suited to the object 230. For example, an object 230 throws a long, dark shadow 234 that a camera can see and is determined by the perception stack 312 to be a solid object and thus extends the object footprint to footprint 236 to include an area that the shadow 234 appears to occupy. In reality, there is nothing in the extended portion of the footprint 236. In this example, the AV footprint 224 will intersect the extended footprint 236 when the AV 102 moves forward as indicated by the arrow.

If a Remote Advisor is brought in because the AV 102 cannot find a path past the object footprint 236, one action would be for the Remote Advisor to delete the object 230 from the perception of the AV 102, referred to herein as "perception override" (PO). This carries the obvious risk that the object 230 will move, as this object 230 is a mobile person, and the AV 102 may collide with the person after the AV 102 has been instructed to ignore the object 230.

There are several cases where the AV 102 perceives an object and experiences an event wherein the AV cannot navigate past. Examples of such cases include

| | |
|---|---|
| Phantom object | a false identification of an object at a location (there is nothing there and the AV erroneously detected an object at that location) |
| Non-critical object | the object can be ignored or driven through |
| Buffer violation | the object is real and the AV footprint will intersect the object footprint on the projected path of the AV |
| Footprint expansion | the AV perception system increases the assigned object footprint based on an update from the sensors (the AV footprint may not have intersected the original object footprint but will intersect the expanded object footprint) |

Once the Remote Advisor has determined that the obstacle is not a real object, i.e., a phantom object, Perception Override may be the appropriate response. An example non-critical object is an overhanging tree branch that hangs low enough to be sensed by one or more of the AV sensors. The AV interprets the tree branch as extending down to the ground but, in reality, the AV will be able to pass under the branch without collision. The problem exists because the object exists, but it is not in the place where the sensors are reporting it. As part of the disclosed perception assistance capability, the Remote Advisor would be able to adjust the height, e.g., the location along the z axis, of the perceived object. In some embodiments, the system may indicate to the Remote Advisor that the detected object will not clear the AV and this height interference is what is preventing the AV from proceeding/being stuck. Once this adjustment is made, the AV would determine that there is room to pass underneath the branch and proceed autonomously. One benefit of using perception assistance instead of a perception override, wherein the AV would have been instructed to ignore the branch, is that the AV will detect and react to a change in the branch position, e.g., the branch falls downward as the AV approaches.

In the case of a buffer violation or footprint expansion, utilizing perception override to remove the object from the perception of the AV and then allowing the AV to proceed under control of its autonomous navigation system may permit the AV to alter the planned path and drive through the object. Thus, there is a need to modify the perception of the object without removing it entirely from the perception of the AV. This is discussed further with respect to FIGS. 4A-6.

FIG. 3 illustrates an example system environment that can be used to facilitate AV operations, according to some aspects of the disclosed technology. One of ordinary skill in the art will understand that, for AV environment 300 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill in the art will appreciate that such variations do not depart from the scope of the present disclosure.

In this example, the AV environment 300 includes an AV 302, a data center 350, and a client computing device 370. The AV 302, the data center 350, and the client computing device 370 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 302 can navigate roadways without a human driver based on sensor signals generated by multiple sensor systems 304, 306, and 308. The sensor systems 304-308 can include one or more types of sensors and can be arranged about the AV 302. For instance, the sensor systems 304-308 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 304 can be a camera system, the sensor system 306 can be a LIDAR system, and the sensor system 308 can be a RADAR system. Other examples may include any other number and type of sensors.

The AV 302 can also include several mechanical systems that can be used to maneuver or operate the AV 302. For instance, mechanical systems can include a vehicle propulsion system 330, a braking system 332, a steering system 334, a safety system 336, and a cabin system 338, among other systems. The vehicle propulsion system 330 can include an electric motor, an internal combustion engine, or both. The braking system 332 can include an engine brake, brake pads, actuators, and/or any other suitable componentry configured to assist in decelerating the AV 302. The steering system 334 can include suitable componentry configured to control the direction of movement of the AV 302 during navigation. The safety system 336 can include lights and signal indicators, a parking brake, airbags, and so forth. The cabin system 338 can include cabin temperature control systems, in-cabin entertainment systems, and so forth. In some examples, the AV 302 might not include human driver actuators (e.g., steering wheel, handbrake, foot brake pedal, foot accelerator pedal, turn signal lever, window wipers, etc.) for controlling the AV 302. Instead, the cabin system 338 can include one or more client interfaces (e.g., Graphical User Interfaces (GUIs), Voice User Interfaces (VUIs), etc.) for controlling certain aspects of the mechanical systems 330-338.

The AV 302 can include a local computing device 310 that is in communication with the sensor systems 304-308, the mechanical systems 330-338, the data center 350, and the client computing device 370, among other systems. The local computing device 310 can include one or more processors and memory, including instructions that can be executed by the one or more processors. The instructions can make up one or more software stacks or components responsible for controlling the AV 302; communicating with the data center 350, the client computing device 370, and other systems; receiving inputs from riders, passengers, and other entities within the AV's environment; logging metrics collected by the sensor systems 304-308; and so forth. In this example, the local computing device 310 includes a perception stack 312, a localization stack 314, a prediction stack 316, a planning stack 318, a communications stack 320, a control stack 322, an AV operational database 324, and an HD geospatial database 326, among other stacks and systems.

Perception stack 312 can enable the AV 302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 304-308, the localization stack 314, the HD geospatial database 326, other components of the AV, and other data sources (e.g., the data center 350, the client computing device 370, third party data sources, etc.). The perception stack 312 can detect and classify objects and determine their current locations, speeds, directions, and the like. In addition, the perception stack 312 can determine the free space around the AV 302 (e.g., to maintain a safe distance from other objects, change lanes, park the AV, etc.). The perception stack 312 can identify environmental uncertainties, such as where to look for moving objects, flag areas that may be obscured or blocked from view, and so forth. In certain embodiments, an output of the perception stack 312 can be a bounding area around a perceived object, referred to herein as a "footprint," that can be associated with a semantic label that identifies the type of object that is within the bounding area, the size of the object, the kinematic of the object (information about its movement), a tracked path of the object, and a description of the pose of the object (its orientation or heading, etc.). In certain embodiments, the perception stack associates the object with a predetermined class of objects.

Localization stack 314 can determine the AV's position and orientation (pose) using different methods from multiple systems (e.g., GPS, IMUs, cameras, LIDAR, RADAR, ultrasonic sensors, the HD geospatial database 326, etc.). For example, in some cases, the AV 302 can compare sensor data captured in real-time by the sensor systems 304-308 to data in the HD geospatial database 326 to determine its precise (e.g., accurate to the order of a few centimeters or less) position and orientation. The AV 302 can focus its search based on sensor data from one or more first sensor systems (e.g., GPS) by matching sensor data from one or more second sensor systems (e.g., LIDAR). If the mapping and localization information from one system is unavailable, the AV 302 can use mapping and localization information from a redundant system and/or from remote data sources.

Prediction stack 316 can receive information from the localization stack 314 and objects identified by the perception stack 312 and predict a future path for the objects. In some examples, the prediction stack 316 can output several likely paths that an object is predicted to take along with a probability associated with each path. For each predicted path, the prediction stack 316 can also output a range of points along the path corresponding to a predicted location of the object along the path at future time intervals along with an expected error value for each of the points that indicates a probabilistic deviation from that point.

Planning stack 318 can determine how to maneuver or operate the AV 302 safely and efficiently in its environment. For example, the planning stack 318 can receive the location, speed, and direction of the AV 302, geospatial data, data regarding objects sharing the road with the AV 302 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 302 from one point to another and outputs from the perception stack 312, localization stack 314, and prediction stack 316. The planning stack 318 can determine multiple sets of one or more mechanical operations that the AV 302 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 318 can select from multiple backup plans to carry out. For example, while preparing to change lanes to turn right at an intersection, another vehicle may aggressively cut into the destination lane, making the lane change unsafe. The planning stack 318 could have already determined an alternative plan for such an event. Upon its occurrence, it could help direct the AV 302 to go around the block instead of blocking a current lane while waiting for an opening to change lanes.

Control stack 322 can manage the operation of the vehicle propulsion system 330, the braking system 332, the steering system 334, the safety system 336, and the cabin system 338. The control stack 322 can receive sensor signals from the sensor systems 304-308 as well as communicate with other stacks or components of the local computing device 310 or a remote system (e.g., the data center 350) to effectuate operation of the AV 302. For example, the control stack 322 can implement the final path or actions from the multiple paths or actions provided by the planning stack 318. This can involve turning the routes and decisions from the planning stack 318 into commands for the actuators that control the AV's steering, throttle, brake, and drive unit.

In certain embodiments, the control stack 322, receives input from the Remote Advisor, e.g., through the remote assistance platform 358, that are an additional input to the algorithms of the control stack 322. In certain embodiments, the control stack 322 weighs the input from the Remote Advisor. For example, a respective weighting factor is assigned to each input based on characteristics of the scene, e.g., an estimated visibility of the object due to environmental factors such as lighting. As another example, different weighting factors are assigned based on the particular Remote Advisor, e.g., years of experience in the role of Remote Advisor and/or job performance. In certain embodiments, different sets of weighting factors are associated with different conditions. For example, a first set of weighting factors is used when the Remote Advisor is receiving low-quality information, e.g., low resolution video, significant latency in the video feed, or a low contrast image (due to a light failure on the AV), while a second set of weighting factors is used when the Remote Advisor is receiving high-quality data, e.g., high resolution images, low latency, or an image with good contrast. In certain embodiments, this weighting functionality is implemented in another stack of the local computing device 310, e.g., the perception stack 312. In certain embodiments, this weighting functionality is implemented in the remote assistance platform 358.

Communications stack 320 can transmit and receive signals between the various stacks and other components of the AV 302 and between the AV 302, the data center 350, the client computing device 370, and other remote systems. The communications stack 320 can enable the local computing device 310 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 320 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 326 can store HD maps and related data of the streets upon which the AV 302 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

AV operational database 324 can store raw AV data generated by the sensor systems 304-308, stacks 312-322, and other components of the AV 302 and/or data received by the AV 302 from remote systems (e.g., the data center 350, the client computing device 370, etc.). In some examples, the raw AV data can include HD LIDAR point cloud data, image data, RADAR data, GPS data, and other sensor data that the data center 350 can use for creating or updating AV geospatial data or for creating simulations of situations encountered by AV 302 for future testing or training of various machine learning algorithms that are incorporated in the local computing device 310.

Data center 350 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 350 can include one or more computing devices remote to the local computing device 310 for managing a fleet of AVs and AV-related services. For example, in addition to managing the AV 302, the data center 350 may also support a ride-hailing service (e.g., a ridesharing service), a delivery service, a remote/roadside assistance service, street services (e.g., street mapping, street patrol, street cleaning, street metering, parking reservation, etc.), and the like.

Data center 350 can send and receive various signals to and from the AV 302 and the client computing device 370. These signals can include sensor data captured by the sensor systems 304-308, roadside assistance requests, software updates, ride-hailing/ridesharing pick-up and drop-off instructions, and so forth. In this example, the data center 350 includes a data management platform 352, an Artificial Intelligence/Machine Learning (AI/ML) platform 354, a simulation platform 356, a remote assistance platform 358, and a ride-hailing platform 360, and a map management platform 362, among other systems.

Data management platform 352 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of data center 350 can access data stored by the data management platform 352 to provide their respective services.

The AI/ML platform 354 can provide the infrastructure for training and evaluating machine learning algorithms for operating the AV 302, the simulation platform 356, the remote assistance platform 358, the ride-hailing platform 360, the map management platform 362, and other platforms and systems. Using the AI/ML platform 354, data scientists can prepare data sets from the data management platform 352; select, design, and train machine learning models; evaluate, refine, and deploy the models; maintain, monitor, and retrain the models; and so on.

Simulation platform 356 can enable testing and validation of the algorithms, machine learning models, neural networks, and other development efforts for the AV 302, the remote assistance platform 358, the ride-hailing platform 360, the map management platform 362, and other platforms and systems. Simulation platform 356 can replicate a variety of driving environments and/or reproduce real-world scenarios from data captured by the AV 302, including rendering geospatial information and road infrastructure (e.g., streets, lanes, crosswalks, traffic lights, stop signs, etc.) obtained from a cartography platform (e.g., map management platform 362); modeling the behavior of other vehicles, bicycles, pedestrians, and other dynamic elements; simulating inclement weather conditions, different traffic scenarios; and so on.

Remote assistance platform 358 can generate and transmit instructions regarding the operation of the AV 302. For example, in response to an output of the AI/ML platform 354 or other system of the data center 350, the remote assistance platform 358 can prepare instructions for one or more stacks or other components of the AV 302.

Ride-hailing platform 360 can interact with a customer of a ride-hailing service via a ride-hailing application 372 executing on the client computing device 370. The client computing device 370 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 372. The client computing device 370 can be a customer's mobile computing device or a computing device integrated with the AV 302 (e.g., the local computing device 310). The ride-hailing platform 360 can receive requests to pick up or drop off from the ride-hailing application 372 and dispatch the AV 302 for the trip.

Map management platform 362 can provide a set of tools for the manipulation and management of geographic and spatial (geospatial) and related attribute data. The data management platform 352 can receive LIDAR point cloud data, image data (e.g., still image, video, etc.), RADAR data, GPS data, and other sensor data (e.g., raw data) from one or more AVs 302, Unmanned Aerial Vehicles (UAVs), satellites, third-party mapping services, and other sources of geospatially referenced data. The raw data can be processed, and map management platform 362 can render base representations (e.g., tiles (2D), bounding volumes (3D), etc.) of the AV geospatial data to enable users to view, query, label, edit, and otherwise interact with the data. Map management platform 362 can manage workflows and tasks for operating on the AV geospatial data. Map management platform 362 can control access to the AV geospatial data, including granting or limiting access to the AV geospatial data based on user-based, role-based, group-based, task-based, and other attribute-based access control mechanisms. Map management platform 362 can provide version control for the AV geospatial data, such as to track specific changes that (human or machine) map editors have made to the data and to revert changes when necessary. Map management platform 362 can administer release management of the AV geospatial data, including distributing suitable iterations of the data to different users, computing devices, AVs, and other consumers of HD maps. Map management platform 362 can provide analytics regarding the AV geospatial data and related data, such as to generate insights relating to the throughput and quality of mapping tasks.

In some embodiments, the map viewing services of map management platform 362 can be modularized and deployed as part of one or more of the platforms and systems of the data center 350. For example, the AI/ML platform 354 may incorporate the map viewing services for visualizing the effectiveness of various object detection or object classification models, the simulation platform 356 may incorporate the map viewing services for recreating and visualizing certain driving scenarios, the remote assistance platform 358 may incorporate the map viewing services for replaying traffic incidents to facilitate and coordinate aid, the ride-hailing platform 360 may incorporate the map viewing services into the client application 372 to enable passengers to view the AV 302 in transit enroute to a pick-up or drop-off location, and so on.

While the autonomous vehicle 302, the local computing device 310, and the autonomous vehicle environment 300 are shown to include certain systems and components, one of ordinary skill will appreciate that the autonomous vehicle 302, the local computing device 310, and/or the autonomous vehicle environment 300 can include more or fewer systems and/or components than those shown in FIG. 3. For example, the autonomous vehicle 302 can include other services than those shown in FIG. 3 and the local computing device 310 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 3.

In certain embodiments, the remote assistance platform 358 comprises a user interface (not shown in FIG. 3) that enables a human Remote Advisor to view the environment around the AV 302 through one or more of the sensor systems 304, 306, 308 and issue commands to the local computing device 310 of the AV 302. In certain embodiments, the remote assistance platform 358 notifies a human Remote Advisor that an "event" has occurred, wherein the AV 302 requires assistance to resolve the event. In certain embodiments, the event comprises a situation wherein the AV 302 is unable to navigate past an object that obstructs its planned path or the AV 302 otherwise cannot proceed along the determined path. In certain embodiments, the event comprises a situation wherein the AV 302 predicts that it will be unable to navigate past an object at some point along its planned path, although the AV 320 is continuing on the path at the time of notification. In certain embodiments, the remote assistance platform 358 comprises a set of rules that describe at least one of allowed actions and prohibited actions. In certain embodiments, the remote assistance platform 358 provides information from a time period leading up to the event that has stopped the AV 302. In certain embodiments, the remote assistance platform 358 provides a recommendation, e.g., a determination about how to modify an object's footprint, based not only on what is currently being perceived by the sensor systems 304, 306, 308 but also on what has been recently perceived by the sensor systems 304, 306, 308. In certain embodiments, the remote assistance platform 358 comprises limits on how a change in perception is implemented, e.g., a perception change can only be implemented while holding the AV 302 stationary. In certain embodiments, a change in perception is allowed to be implemented while the AV 302 in motion under certain conditions.

With reference to certain embodiments of the systems and methods disclosed herein, the data center 350 comprises a site controller (not shown) that manages the parking of AVs in a parking area, e.g., a parking lot, a service area, or a support site for the maintenance, servicing, and storage of AVs. In certain embodiments, the site controller is provided as a software service running on a processor, e.g., a central server with associated memory storage, co-located with other functions of the data center 350. In certain embodiments, the site controller is provided as a standalone hardware system that comprises a processor and a memory and is located at a separate location, e.g., a parking area managed by the site controller. In either embodiment, the memory comprises one or more of instructions that, when loaded into the processor and executed, cause the processor to execute the methods of managing the site as disclosed herein.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

FIGS. 4A and 4B are a perspective view and a plan view, respectively, of an example scenario 400 wherein an AV 102 is unable to autonomously navigate past an obstacle 402, according to some aspects of the disclosed technology. In this example, the obstacle is a traffic cone 402. The traffic cone 402 has been assigned an object footprint 410. The local computing device 310 of the AV 102 has determined that the AV footprint 224 will intersect the object footprint 410 if the AV 102 proceeds forward in the direction indicated by the arrow. The additional obstacles that prevent the AV 102 from driving around the object footprint 410 have been omitted for clarity.

As used in this disclosure, the phrases "perception assistance" (PA) and "perception modification" and the like refer to a change in the footprint or other attribute of the AV or an external object as stored in the AV 102 system. In certain embodiments, PA includes one or more of a change in a size of an object footprint, a change in the shape of an object footprint, a weighting factor associated with an object, a risk factor associated with the object, a change in the rules for evaluating the proximity of the object to the AV, and a restriction on when certain actions can be implemented.

FIGS. 5-6 depict examples of how PA enables the AV to autonomously navigate past the obstacle shown in FIGS. 4A-4B, according to some aspects of the disclosed technology. FIGS. 5-6 are enlarged views of FIG. 4B around the area "A."

FIG. 5 depicts a first example of a perception assistance scenario, wherein the Remote Advisor has modified the object footprint 410 based on observation of the object 402 through the sensors of AV 102. In this example, the Remote Advisor determined that the object footprint 410 was over-sized for the actual traffic cone 402. This may occur if the traffic cone was classified as a "traffic guidance device" and the single object footprint associated with this class was sized to accommodate the largest device in use. In some embodiments, the remote assistance platform 358 may determine that the footprint 410 of the cone is preventing the AV 102 from preceding forward (i.e., it is determined that the AV 102 will intersect with the footprint 410 if proceeding along the current path and the AV 102 can otherwise not be pathed to avoid the footprint 410). Based on this determination, the remote assistance platform 358 may highlight this issue in a graphical user interface presented to the Remote Advisor. In particular, the interface may highlight the point(s) or area of possible interaction/collision with the footprint 410 and/or indicate an adjustment of the footprint 410 that would prevent an interaction/collision with the footprint 410 and allow the AV 102 to proceed autonomously. In one embodiment, this determination as to a size of the footprint 410 that would allow the AV 102 proceed is based on the remote assistance platform 358 simulating movement of the AV 102 using progressively smaller footprints 410 until the AV 102 can proceed Alternatively, the remote assistance platform 358 may determine an area of interaction/collision between the AV 102 and the footprint 410 and reduce the size of the footprint 410 to remove this overlapping area. After visually inspecting a picture of the traffic cone 402 obtained with a camera on the AV 102, the Remote Advisor decides that the object footprint 410 can safely be reduced to object footprint 510. In one embodiment, the object footprint 510 may have been suggested by the remote assistance platform 358 and the Remote Advisor may confirm the change following viewing the sensor data. After this change is downloaded to the AV local computing device 310, the planning stack 318 determines that the AV footprint 224 will not intersect the reduced footprint 510 if the AV 102 proceeds, as indicated by the arrow 520 that illustrates how the corner of the AV footprint 224 will pass by the object footprint 510. This change retains all the safety limits and rules of the AV autonomous navigation system as the AV 102 is still responsible for reviewing the object 402 even though the footprint has been updated.

In certain scenarios, this type of perception assistance may be prohibited. In certain scenarios, the remote assistance platform 358 comprises a rule on what classes of objects may be modified by a Remote Advisor. For example, in certain embodiments, the remote assistance platform 358 or the AV local computing device 310 would prohibit the Remote Advisor from modifying the object footprint if the object 402 was classified as a person. In certain embodiments, this same prohibition is applicable for a number of classifications, e.g., an object associated with a person (e.g., bicycle, baby stroller, etc.), an animal, an object that may move on its own volition or on the volition of a human that controls the object (a vehicle in a traffic lane), or an object likely to damage the AV 102 if there is a collision (e.g., a heavy barrier). In these situations, the remote assistance platform 358 may indicate that the failure of the AV 102 to move is based on a possible collision of a footprint of the AV 102 with a footprint of object as the AV 102 traverses the current path but note that the footprint of object cannot be adjusted based on the classification of the object. In some embodiments, in this scenario in which the remote assistance platform 358 prevents the Remote Advisor from adjusting the footprint of the object and when the Remote Advisor notes that the classification is erroneous, the Remote Advisor may be allowed to change the classification of the object. If this change allows the footprint of the object to be adjusted, the remote assistance platform 358 may indicate an adjusted footprint that would facilitate the AV 102 proceeding along the current path or along another possible path.

In certain scenarios, the object 402 may not have been classified by the AV local computing device 310, i.e., the object is classified as "unknown." In certain embodiments, the Remote Advisor would be authorized to manually assign a classification to the object 402 whereupon the AV local computing device 310 identifies the appropriate object footprint. In certain embodiments, manually classifying the object is sufficient for the AV 102 to navigate around the object or allow the Remote Advisor to adjust the footprint (when needed) such that a possible collision will not occur.

In certain embodiments, a perception modification does not persist if the object itself moves. For example, if an object tagged as a stationary class begins to move, then the perception modification is immediately terminated for safety. For instance, the remote assistance platform 358 may return the footprint of the object to the original configuration and/or size. In an alternate example, if the Remote Advisor determines that the object, e.g., an overhanging tree branch, is identified and will not intersect with the AV, the perception modification will persist even when the tree branch begins moving in the wind.

FIG. 6 depicts a second example of the perception assistance scenario, wherein the Remote Advisor has modified the AV footprint 224 based on observation of the object 402 through the sensors of AV 102. In this example, the Remote Advisor determined that it is safe to reduce the lateral buffer 520 of the AV 102. After this change is downloaded to the AV local computing device 310, the planning stack 318 determines that the reduced AV footprint 522 will not intersect the object footprint 410 if the AV 102 proceeds, as indicated by the arrow 522 that illustrates how the corner of the reduced AV footprint 512 will pass by the original object footprint 410. In certain scenarios, the modification to the AV footprint 224 expires after one of a time duration, e.g., the modification expires after 2 minutes, a distance traveled since the modification, e.g., the modification expires after the car travels 10 meters, and a proximity of the object 402 to the AV 102, e.g., the modification expires after the object

402 is no longer within the sensor range of the LiDAR unit 110 or after the original or updated footprint of the AV 102 has passed the object.

In certain embodiments, a default AV footprint is stored in the AV 102 and used in the autonomous navigation and the adjustment of the AV footprint is performed on the stored default AV footprint. In certain embodiments, an adjustment of the AV footprint is made when an event occurs. In certain embodiments, the adjustment is later ended, e.g., the AV footprint returns to the prior value, after the event is resolved, e.g., after the AV has moved past the object 402, thereby restoring use of the default AV footprint. In certain embodiments, the adjustment ends upon occurrence of a new event, e.g., the AV detects a collision. In some embodiments, the remote assistance platform 358 may determine that the footprint 410 of the cone is preventing the AV 102 from preceding forward (i.e., it is determined that the AV 102 will intersect with the footprint 410 if proceeding along the current path and the AV 102 can otherwise not be pathed to avoid the footprint 410). Based on this determination, the remote assistance platform 358 may highlight this issue in a graphical user interface presented to the Remote Advisor. In particular, the interface may highlight the point(s) or area of possible interaction/collision with the footprint 410 and/or indicate an adjustment of the footprint 224 that would prevent an interaction/collision with the footprint 410 and allow the AV 102 to proceed autonomously. In one embodiment, this determination as to a size of the footprint 224 that would allow the AV 102 proceed is based on the remote assistance platform 358 simulating movement of the AV 102 using progressively smaller footprints 224 until the AV 102 can proceed. Alternatively, the remote assistance platform 358 may determine an area of interaction/collision between the AV 102 and the footprint 410 and reduce the size of the footprint 224 to remove this overlapping area. In some embodiments, the remote assistance platform 358 may have a set of thresholds that restrict how small the AV threshold 224 can be adjusted (e.g., the thresholds correspond to the known bounds of the AV 102). In some embodiments, each threshold in the set of thresholds for adjusting the footprint 224 correspond to different heights of the AV 102 relative to the road. For example, while the AV 102 may be narrower nearer the road, the AV may expand out nearer protrusions toward the top of the AV 102 (e.g., protrusions from sensors or side mirrors). In this embodiment, the remote assistance platform 358 may present suggested footprints 224 that would not interact with the height of the object after adjustment. For instance, if the remote assistance platform 358 determines that the height of the cone object 402 would not interfere with a side mirror of the AV 102, the remote assistance platform 358 may suggest a smaller footprint corresponding to a height of the AV 102 below the side mirror. Conversely, if the remote assistance platform 358 determines that the height of the cone object 402 would interfere with a side mirror of the AV 102, the remote assistance platform 358 may suggest a larger footprint corresponding to a height of the AV 102 at the side mirror. Similar thresholds can be applied for suggesting and enforcing adjustments to the size of the object footprints based on the height and shape of the object and the height and shape of the AV 102. After visually inspecting a picture of the traffic cone 402 obtained with a camera on the AV 102, the Remote Advisor decides that the AV footprint 224 can safely be reduced to object footprint 522 within the suggestion and set of thresholds. In one embodiment, the AV footprint 522 may have been suggested by the remote assistance platform 358 and the Remote Advisor may confirm the change following viewing the sensor data. After this change is downloaded to the AV local computing device 310, the planning stack 318 determines that the object footprint 410 will not intersect the reduced footprint 522 if the AV 102 proceeds, as indicated by the arrow 522 that illustrates how the corner of the AV footprint 522 will pass by the object footprint 410. This change retains all the safety limits and rules of the AV autonomous navigation system as the AV 102 is still responsible for reviewing the object 402 even though the footprint 522 has been updated.

In certain scenarios, the remote assistance platform 358 comprises a restriction on the AV 102 behavior while the modified footprint is in effect, e.g., the AV 102 is limited to 7 kph until the object 402 is behind the AV 102. In some embodiments, the speed of the AV 102 is limited based on the degree of reduction of the AV footprint and/or the object footprint (e.g., both the footprint reductions are taken into account when considering an upper speed limit for the AV 102).

In certain scenarios, the local computing device 310 of AV 102 is configured to determine what modifications to one or both of the AV footprint 224 and the object footprint 410 will enable the AV 102 to autonomously maneuver past the object 402. For example, the local computing device 310 determines that a 0.1 m reduction in the lateral buffer 520 is sufficient to enable the AV 102 to travel past the object 402 without violating a safety or navigation limit. In certain embodiments, the local computing device 310 presents this option to the Remote Advisor through the remote assistance platform 358 and the Remote Advisor then has the option to approve this modification to the AV footprint 224.

Although adjustment of the AV and object footprints is described as uniformly changing the entire shape of the footprints, in some embodiments, adjustment of the size of the footprints may be non-uniform. For example, a single side of the footprint may be reduced to allow the AV 102 to continue along a path. In some embodiments, the shape of a footprint may be changed. For example, the remote assistance platform 358 may determine that using a rounded, circular, or oval footprint for the AV and/or an object may allow the AV 102 to complete a turn without colliding with a footprint of an object. The remote assistance platform 358 may present this shape for consideration and possible selection by the Remote Advisor.

As noted above, following some event (e.g., passage of time, distance, or after the AV 102 passes the object), the footprints of the AV 102 and/or object may return to their original shapes and/or sizes. In some embodiments, this return to their original shapes and/or sizes may be gradual or phased so as to allow the AV 102 to make smoother transition along a path (e.g., an oval shape footprint may gradually transform into a rectangle and/or a reduced size rectangle footprint may transition to an originally sized rectangle footprint over a transition duration).

FIGS. 7-8 depict another example scenario 700 that illustrates how perception assistance enables an AV 102 to autonomously navigate past an obstacle, according to some aspects of the disclosed technology. As shown in FIG. 7, a series of vehicles having footprints 710-713 are parked along the left side of a street 702 and vehicle having footprints 714-715 are parked along the right side of the street 702. A large vehicle 720 has stopped in the middle of the street 702. An AV 102, having an AV footprint 224, has approached the gap between the vehicle 720 and the left-side row of vehicles. As the AV 102 entered the gap, the change in viewing angle of the vehicle 720 caused the perception stack 312 of the AV 102 to expand the footprint 722 such that the footprint 722 overlaps the AV footprint 244. The prediction stack 316 updates its best possible path forward, as indicated by the sequence of positions 730, 732, 734 of the AV footprint 224, and identifies that one or more of these future positions will intersect one of the vehicle footprints, e.g., position 732 of the AV footprint 244 will intersect vehicle footprint 711. The AV 102 cannot autonomously identify a path and a Remote Advisor contacts the AV 102 to assist.

In this example, perception override, e.g., instructing the AV 102 to ignore one of the sensed objects, is not appropriate as the Remote Advisor can verify that the objects are real and pose a risk of collision. Similarly, it may be undesirable for the Remote Advisor to attempt to directly drive the AV 102 as the clearances are small and there are several possible points of possible collision. There are several options described herein, however, that may enable the AV 102 to continue under autonomous control.

In certain embodiments, the Remote Advisor may be able to determine that the actual distance between the AV outline 210 (see FIG. 2) and the actual vehicle of footprint 711 is sufficient to allow AV 102 to pass through the gap if the lateral buffer 520 (see FIG. 6) is reduced by a certain amount. The Remote Advisor then reduces the lateral buffer by a selected amount and allows the AV 102 to continue under autonomous control.

In certain embodiments, the Remote Advisor may implement other forms of perception adjustment. For example, the Remote Advisor determines that the object footprint 722 is too small, e.g., a portion of the actual vehicle 720 exceeds footprint 722, and chooses a perception modification that expands the object footprint 722 in one or more attributes. In certain embodiments, this expansion forces the control stack 322 to re-evaluate previously identified possible navigation paths and choose an alternate path or beck up along the current path until an alternate path is available. In certain embodiments, the remote assistance platform 358 provides an ability to create a virtual barrier of a selected size and placement that will force the control stack 322 to autonomously choose an alternate path.

In certain embodiments, the Remote Advisor may be able to verify/determine that the actual distance between the AV outline 210 and the actual vehicle 720 is sufficient to allow AV 102 to back up to a position, e.g., position 802 in FIG. 8, that would allow the AV 102 to autonomously navigate through the gap between footprint 711 and the expanded footprint 722. In certain embodiments, the Remote Advisor manually moves the AV 102 to position 802. In certain embodiments, the Remote Advisor instructs the AV to autonomously follow a designated path and/or move to position 802. In certain embodiments, the instructions from the Remote Advisor would include an instruction for the local computing device 310 of AV 102 to retain the footprint 722 as defined at the time of the original stoppage, i.e., as shown in FIG. 7, for the duration of interaction with the vehicle 720. In certain embodiments, once the AV 102 is in position 802, the AV 102 provides a path prediction to the Remote Advisor that either confirms that the AV 102 will be able to maneuver past the obstacles or identifies what obstacles now block the AV 102.

FIG. 9 depicts another possible action to enable the AV 102 to proceed in the example scenario represented in FIGS. 7 and 8. The Remote Advisor may be able to determine that the actual distance between the AV outline 210 and the actual vehicle 720 is sufficient to allow AV 102 to pass through the gap if the footprint 722 is modified, e.g., the corner closest to the AV 102 is reshaped to footprint 724. In certain embodiments, the disclosed system and methods enable the Remote Advisor to modify the footprint of an object or the AV in at least one of shape and size.

Figure 10:
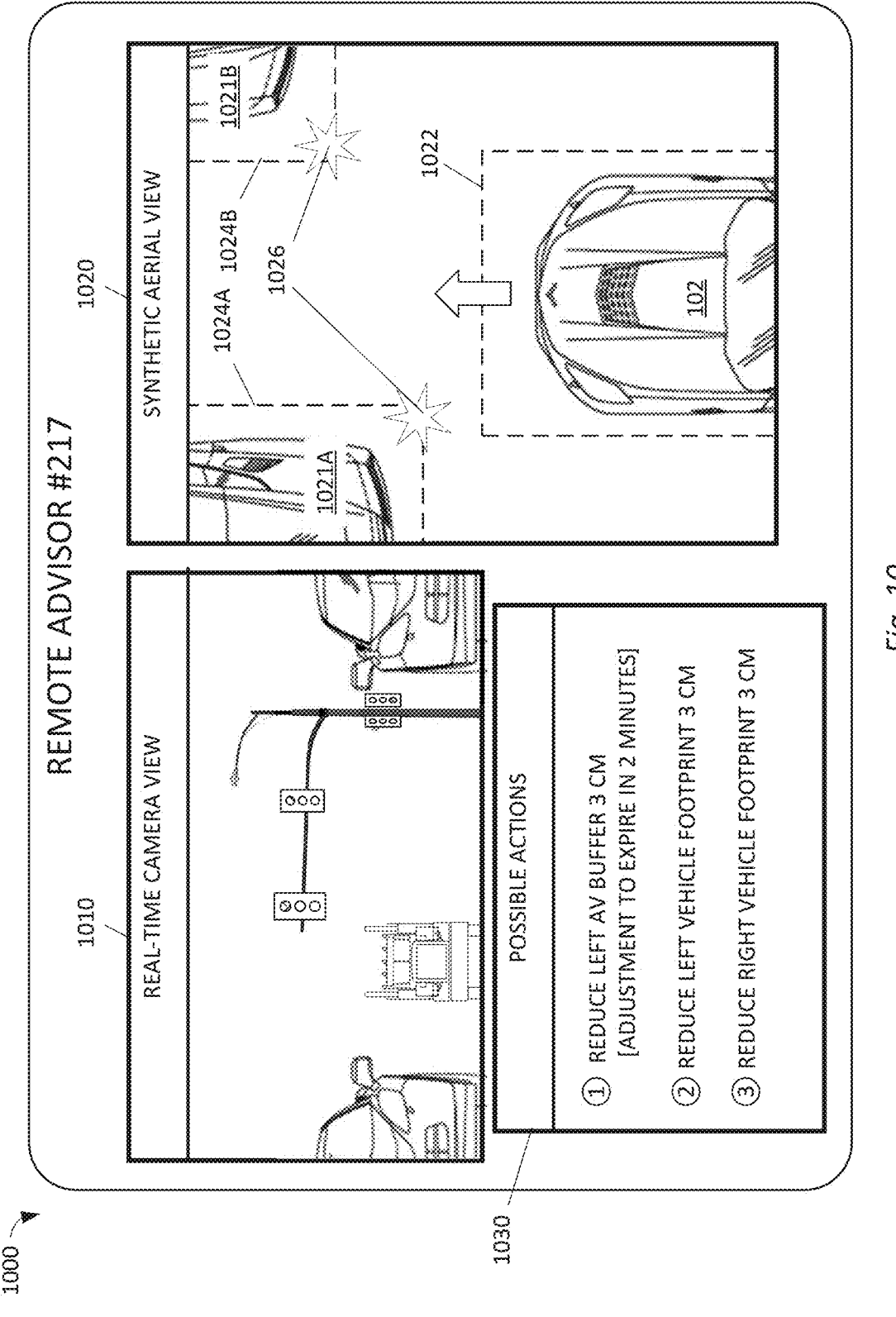
FIG. 10 depicts an example user interface for the remote assistance platform, according to some aspects of the disclosed technology.

FIG. 10 depicts an example user interface 1000 for the remote assistance platform (RAP) 358, according to some aspects of the disclosed technology. In this example, an AV 102 has encountered a situation that impedes its ability to autonomously follow a selected path, wherein the space between two parked cars 1021A, 1021B is narrower than the footprint 1022 of the AV 102. In this example, three windows of information are presented to a human Remote Advisor, e.g., Remote Advisor identification number 217. A first window 1010 displays a real-time view from a camera mounted on the AV 102. A second window 1020 displays a synthetic aerial view of the local environment, including portions of the AV 102 and the parked vehicles 1021A, 1021B. The RAP 358 has mapped the footprints 1022, 1024A, 1024B based on sensor data provided by the AV 102. The RAP 358 has also provided markers 1026 that identify potential points of intersection between the footprint 1022 of the AV 102 and the footprints 1024A, 1024B of the parked vehicles 1021A, 1021B if the AV 102 proceeds in its current direction, as determined by the local computing device 310.

The user interface 1000 also includes a third window 1030 that provides possible actions to modify the perception of objects by the AV 102 that may allow the AV 102 to proceed to autonomously navigate past this obstruction. In this example, the RAP 358 offers three options including altering the perception of the footprints 1024A and/or 1024B and allowing a temporary adjustment of the footprint 1022 of the AV 102. The option #1 of reducing the buffer of the footprint 1022 includes a note to remind the Remote Advisor that this adjustment is temporary.

In certain embodiments, the user interface 1000 comprises additional features, e.g., a button (not shown in FIG. 10) to pull up additional adjustments that the Remote Advisor may select. In certain embodiments, the Remote Advisor is able to switch the camera proving the view of window 1010. In certain embodiments, window 1020 provides a distance overlay that enables the Remote Advisor to determine the distances between selected points, e.g., the separation of footprints 1022 and 1024A.

In summary, the disclosed systems and methods provide a capability for a Remote Advisor to modify the perception of objects by the AV so as to enable the AV to autonomously continue its travel without disabling a safety feature of the navigation software. While perception override continues to be the appropriate action in some situations, the ability to implement perception override is not appropriate in certain scenarios due to the inherent risks.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

In the above description, terms such as "upper," "upward," "lower," "downward," "above," "below," "longitudinal," "lateral," and the like, as used herein, are explanatory in relation to respective view of the item presented in the associated figure and are not limiting in the claimed use of the item. The term "outside" refers to a region that is beyond the outermost confines of a physical object. The term "inside" indicates that at least a portion of a region is partially contained within a boundary formed by the object.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language reciting "an item" or similar language indicates and includes one or more of the items. For example, claim language reciting "a part" means one part or multiple parts. Moreover, claim language reciting "at least one of" a set indicates that one member of the set or multiple members of the set satisfy the claim. For example, claim language reciting "at least one of A and B" means A, B, or A and B.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Statements of the disclosure include:

A1 A system to allow adjustment of a perception of an object by an autonomous vehicle (AV), the system comprising a remote assistance platform (RAP) communicatively coupled to the AV, the RAP comprising a user interface that enables a human Remote Advisor to view an environment around the AV through a sensor system of the AV and issue instructions to the AV, wherein the RAP is configured to allow the Remote Advisor to: select an adjustment of the perception of the object by the AV; and instruct the AV to implement the selected adjustment and then navigate autonomously.

A2. The system of A1, wherein: the AV has an AV footprint; the object has an object footprint and has been assigned a class; the adjustment is selected from a group of: an adjustment of the AV footprint; an adjustment of the object footprint; an adjustment of an attribute of the assigned class; and an allowed amount of intrusion of the object footprint into the AV footprint.

A3. The system of A2, wherein the adjustment of the AV footprint comprises a reduction in a lateral buffer of the AV.

A4. The system of A2, wherein: a default AV footprint is stored in the AV and used in the autonomous navigation; the adjustment of the AV footprint is performed on the stored default AV footprint; and the adjustment of the AV footprint is ended after the AV has moved past the object, thereby restoring use of the default AV footprint.

A5. The system of A2, wherein: the AV perceives the object by executing steps: detecting an object based on a sensor output; classifying the object as one of a predetermined set of classes; and assigning a predetermined object footprint to the object based in part on the class of the object; and the adjustment of the object footprint is performed on the assigned predetermined object footprint.

A6. The system of A5, wherein the RAP comprises a first restriction preventing the Remote Advisor from selecting an adjustment of the perception of the object for one or more of the predetermined set of classes.

A7. The system of A5, wherein the RAP comprises a second restriction preventing the Remote Advisor from selecting a perception override for one or more of the predetermined set of classes.

B8. A method of allowing adjustment of a perception of an object by an autonomous vehicle (AV), comprising: providing a view of an environment around the AV through a sensor system of the AV to a human Remote Advisor; allowing the Remote Advisor to select an adjustment of the perception of the object by the AV; and instructing the AV to implement the selected adjustment and then navigate autonomously.

B9. The method of B8, wherein: the AV has an AV footprint; the object has an object footprint and has been assigned a class; the adjustment is selected from a group of: an adjustment of the AV footprint; an adjustment of the object footprint; an adjustment of an attribute of the assigned class; and an allowed amount of intrusion of the object footprint into the AV footprint.

B10. The method of B9, wherein the adjustment of the AV footprint comprises a reduction in a lateral buffer of the AV.

B11. The method of B9, wherein: a default AV footprint is stored in the AV and used in the autonomous navigation; the adjustment of the AV footprint is performed on the stored default AV footprint; and the adjustment of the AV footprint is cancelled after the AV has moved past the object, thereby restoring use of the default AV footprint.

B12. The method of B9, wherein: the AV perceives the object by executing steps: detecting an object based on a sensor output; classifying the object as one of a predetermined set of classes; and assigning a predetermined object footprint to the object based in part on the class of the object; and the adjustment of the object footprint is performed on the assigned predetermined object footprint.

B13. The method of B12, further comprising: preventing the Remote Advisor from selecting an adjustment of the perception of the object for one or more of the predetermined set of classes.

B14. The method of B12, further comprising: preventing the Remote Advisor from selecting a perception override for one or more of the predetermined set of classes.

C15. A memory contains instructions that, when loaded into a processor of a remote assistance platform (RAP) communicatively coupled to an autonomous vehicle (AV) and executed, cause the processor to cause the system to: provide a view of an environment around the AV through a sensor system of the AV to a human Remote Advisor; allow the Remote Advisor to select an adjustment of the perception of the object by the AV; and instruct the AV to implement the selected adjustment and then navigate autonomously.

C16. The memory of C15, wherein: the AV has an AV footprint; the object has an object footprint and has been assigned a class; the adjustment is selected from a group of: an adjustment of the AV footprint; an adjustment of the object footprint; an adjustment of an attribute of the assigned class; and an allowed amount of intrusion of the object footprint into the AV footprint.

C17. The memory of C16, wherein the adjustment of the AV footprint comprises a reduction in a lateral buffer of the AV.

C18. The memory of C16, wherein: a default AV footprint is stored in the AV and used in the autonomous navigation; the adjustment of the AV footprint is performed on the stored default AV footprint; and the adjustment of the AV footprint is cancelled after the AV has moved past the object, thereby restoring use of the default AV footprint.

C19. The memory of C16, wherein: the AV perceives the object by executing steps: detecting an object based on a sensor output; classifying the object as one of a predetermined set of classes; and assigning a predetermined object footprint to the object based in part on the class of the object; and the adjustment of the object footprint is performed on the assigned predetermined object footprint.

C20. The memory of C19, wherein the instructions further cause the processor to cause the memory to perform one or more of: prevent the Remote Advisor from selecting an adjustment of the perception of the object for one or more of the predetermined set of classes; and prevent the Remote Advisor from selecting a perception override for one or more of the predetermined set of classes.

What is claimed is:

1. A system for assisting an autonomous vehicle (AV), the system comprising:
a processor and non-transitory memory storing instructions that, when executed by the processor, cause the processor to perform remote assistance operations (RAOs);
the processor communicatively coupled to the AV; and
a user interface coupled to the processor;
wherein the RAOs are configured to perform an analysis of an obstruction and a current state of the AV and, based on a result of the analysis, present to a human Remote Advisor through the user interface perception adjustment options that are derived by simulating AV motion under varied perception parameters and by determining an adjustment that removes a predicted interaction between an AV footprint and an object footprint while maintaining AV safeguards;
wherein the user interface highlights areas of the predicted interaction;
wherein the presented perception adjustment options are parameter modifications to perception used by the AV to represent objects and plan motion during autonomous navigation and are distinct from selectable object classification labels and distinct from path or reroute commands; and
wherein the RAOs are further configured to perform one or more of:
accept a selection of a perception adjustment;
instruct the AV to adjust a perception of an object;
instruct the AV to adjust the AV footprint; and
instruct the AV to navigate autonomously after implementing the instructed adjustment.

2. The system of claim 1, wherein:
the object has an object footprint and has been assigned a class; and
the adjustment comprises:
an adjustment of the object footprint;
an adjustment of an attribute of the assigned class;
an allowed amount of intrusion of the object footprint into the AV footprint; or a combination thereof.

3. The system of claim 2, wherein the adjustment of the AV footprint comprises a reduction in a lateral buffer of the AV.

4. The system of claim 2, wherein:
a default AV footprint is stored in the AV and used in the autonomous navigation;
the adjustment of the AV footprint is performed on the stored default AV footprint; and the adjustment of the AV footprint is ended after the AV has moved past the object, thereby restoring use of the default AV footprint.

5. The system of claim 2, wherein:
the AV perceives the object by executing steps:
detecting an object based on a sensor output;
classifying the object as one of a predetermined set of classes; and
assigning a predetermined object footprint to the object based in part on the class of the object; and
the adjustment of the object footprint is performed on the assigned predetermined object footprint.

6. The system of claim 5, wherein the RAOs comprise a first restriction preventing the human Remote Advisor from selecting an adjustment of the perception of the object for one or more of the predetermined set of classes.

7. The system of claim 5, wherein the RAOs comprise a second restriction preventing the human Remote Advisor from implementing a perception override for one or more of the predetermined set of classes.

8. A method of allowing adjustment of a perception of an object by an autonomous vehicle (AV), the method comprising:

provide a view of an environment around the AV through a sensor system of the AV to a human Remote Advisor;

performing an analysis of an obstruction and a current state of the AV and, based on a result of the analysis, presenting to the human Remote Advisor through a user interface perception adjustment options that are derived by simulating AV motion under varied perception parameters and by determining an adjustment that removes a predicted interaction between an AV footprint and an object footprint while maintaining AV safeguards;

highlighting, in the user interface, areas of the predicted interaction;

wherein the presented perception adjustment options are parameter modifications to perception used by the AV to represent objects and plan motion during autonomous navigation and are distinct from selectable object classification labels and distinct from path or reroute commands;

accepting, from the human Remote Advisor via the user interface, a selection of one of the presented perception adjustment options; and instructing the AV to implement the selected perception adjustment and then navigate autonomously after implementing the selected perception adjustment.

9. The method of claim 8, wherein:

the AV has an AV footprint;

the object has an object footprint and has been assigned a class;

the perception adjustment is selected from a group of:

an adjustment of the AV footprint;

an adjustment of the object footprint;

an adjustment of an attribute of the assigned class; and an allowed amount of intrusion of the object footprint into the AV footprint.

10. The method of claim 9, wherein the adjustment of the AV footprint comprises a reduction in a lateral buffer of the AV.

11. The method of claim 9, wherein:

a default AV footprint is stored in the AV and used in the autonomous navigation;

the adjustment of the AV footprint is performed on the stored default AV footprint; and the adjustment of the AV footprint is cancelled after the AV has moved past the object, thereby restoring use of the default AV footprint.

12. The method of claim 9, wherein:

the AV perceives the object by executing steps:

detecting an object based on a sensor output;

classifying the object as one of a predetermined set of classes; and assigning a predetermined object footprint to the object based in part on the class of the object; and the adjustment of the object footprint is performed on the assigned predetermined object footprint.

13. The method of claim 12, further comprising:

preventing the human Remote Advisor from selecting an adjustment of the perception of the object for one or more of the predetermined set of classes.

14. The method of claim 12, further comprising:

preventing the human Remote Advisor from selecting a perception override for one or more of the predetermined set of classes.

15. A non-transitory memory contains instructions that, when loaded into a processor of a remote assistance platform (RAP) communicatively coupled to an autonomous vehicle (AV) and executed, cause the processor to cause the system to:

provide a view of an environment around the AV through a sensor system of the AV to a human Remote Advisor;

perform an analysis of an obstruction and a current state of the AV and, based on a result of the analysis, present to the human Remote Advisor through a user interface perception adjustment options that are derived by simulating AV motion under varied perception parameters and by determining an adjustment that removes a predicted interaction between an AV footprint and an object footprint while maintaining AV safeguards;

highlight, in the user interface, areas of the predicted interaction;

wherein the presented perception adjustment options are parameter modifications to perception used by the AV to represent objects and plan motion during autonomous navigation and are distinct from selectable object classification labels and distinct from path or reroute commands;

accept, from the human Remote Advisor via the user interface, a selection of one of the presented perception adjustment options; and instruct the AV to implement the selected perception adjustment and then navigate autonomously after implementing the selected perception adjustment.

16. The non-transitory memory of claim 15, wherein:

the AV has an AV footprint;

the object has an object footprint and has been assigned a class;

the perception adjustment is selected from a group of:

an adjustment of the AV footprint;

an adjustment of the object footprint;

an adjustment of an attribute of the assigned class; and an allowed amount of intrusion of the object footprint into the AV footprint.

17. The non-transitory memory of claim 16, wherein the adjustment of the AV footprint comprises a reduction in a lateral buffer of the AV.

18. The non-transitory memory of claim 16, wherein:

a default AV footprint is stored in the AV and used in the autonomous navigation;

the adjustment of the AV footprint is performed on the stored default AV footprint; and the adjustment of the AV footprint is cancelled after the AV has moved past the object, thereby restoring use of the default AV footprint.

19. The non-transitory memory of claim 16 wherein:

the AV perceives the object by executing steps:

detecting an object based on a sensor output;

classifying the object as one of a predetermined set of classes; and assigning a predetermined object footprint to the object based in part on the class of the object; and the adjustment of the object footprint is performed on the assigned predetermined object footprint.

20. The non-transitory memory of claim 19, wherein the instructions further cause the processor to cause the non-transitory memory to perform one or more of:

prevent the human Remote Advisor from selecting an adjustment of the perception of the object for one or more of the predetermined set of classes; and prevent the human Remote Advisor from selecting a perception override for one or more of the predetermined set of classes.

\* \* \* \* \*